United States Patent [19]
Fiala et al.

[11] Patent Number: 5,934,337
[45] Date of Patent: Aug. 10, 1999

[54] FIELD INSTALLED INSULATING SYSTEM

[76] Inventors: Anthony Fiala, 3307 El Casa Court, Coquitlam, B.C., Canada, V3E 2P9; Thomas D. Smith, Sr., 7449 Mercer Ter. Dr., Mercer Island, Wash. 98040; Thomas D. Smith, Jr., 15202—10th Dr. NW., Marysville, Wash. 98271

[21] Appl. No.: 08/467,306

[22] Filed: Jun. 6, 1995

[51] Int. Cl.$^6$ .................................................. F16L 9/14
[52] U.S. Cl. ......................... 138/149; 138/151; 138/158; 138/171
[58] Field of Search .................... 138/149, 118.1, 138/125, 139, 147, 151, 158, 167, 171

[56] References Cited

U.S. PATENT DOCUMENTS

| | | | |
|---|---|---|---|
| 1,618,455 | 2/1927 | Lindsay | 138/158 |
| 2,160,009 | 5/1939 | Walker | 138/158 |
| 3,818,949 | 6/1974 | Johnson | 138/158 |
| 4,478,253 | 10/1984 | Everett | 138/149 |
| 4,590,108 | 5/1986 | Nippe | 138/149 |
| 4,657,050 | 4/1987 | Patterson | 138/149 |
| 4,823,845 | 4/1989 | Martin et al. | 138/151 |
| 4,842,908 | 6/1989 | Cohen et al. | 138/149 |
| 5,112,661 | 5/1992 | Pendergraft et al. | 138/151 |
| 5,373,870 | 12/1994 | Derroire et al. | 138/151 |
| 5,400,602 | 3/1995 | Chang et al. | 138/149 |

*Primary Examiner*—James F. Hook
*Attorney, Agent, or Firm*—Thomas W. Secrest

[57] ABSTRACT

There is provided an insulation kit comprising an inner waterproof layer for contacting a pipe to be insulated. On the outside of the inner waterproof layer there is insulation. Then, on the outside of the insulation there is a protective layer to guard the insulation from being damaged by rock, hammer blows, knife marks and the like. The insulation kit can be taken to the field and applied to the exterior of the pipe in a relatively short period of time. The electrical fusion wire can be activated by a voltage of 120 volts or 240 volts in about 12 amps. There results insulation around the pipe to be protected and which insulation provides an inner moisture-proof barrier; the insulation; and, a tough material to resist objects such as screw drivers, knives, rocks and the like.

16 Claims, 2 Drawing Sheets

FIELD INSTALLED INSULATING SYSTEM

(b) CROSS-REFERENCES TO RELATED PATENT APPLICATIONS (if any)

There is two design patent applications, Ser. No. 29/039,886, filing date of 1995 Jun. 6 now abandoned entitled "AN INSULATOR FOR A PIPE", and Ser. No. 29/039,890 entitled "A COMBINATION OF A PIPE AND AN INSULATOR FOR SAID PIPE" being filed on 1995 Jun. 6.

(c) STATEMENT AS TO RIGHTS TO INVENTIONS MADE UNDER FEDERALLY SPONSORED RESEARCH AND DEVELOPMENT (if any)

This invention was made by private money and did not receive federally sponsored research and development money and funds.

(d) BACKGROUND OF THE INVENTION

1. Field of the Invention

The invention is for insulation of a pipe.

In many places for the world and in many different uses it is desirable to insulate a pipe which is carrying a liquid.

One of these instances is a pipe carrying a liquid and the pipe is in a cold area of the world.

If the ambient temperature around the pipe is cold the viscosity of the liquid decreases. With a decrease in the viscosity of a liquid it becomes more difficult to force the liquid through the pipe. In certain instances the liquid may congeal. In extreme cases the liquid may freeze which means that it is impossible to force liquid through the pipe. Generally, these areas are the northern climates of the world.

The liquid which is being forced through the pipe may be petroleum or oil. In the area of Prudhoe Bay, Ak., the ambient temperature may be cold. Hot petroleum is pumped from the earth and transported through pipes. It is necessary to maintain the petroleum in the pipes at a high temperature for ease of pumping the petroleum through the pipes. To maintain the high temperature of the petroleum it is necessary to insulate the pipes.

This invention is directed to insulation and the application of said insulation to pipes for maintaining the temperature of the material in the pipes.

There may be a converse to the foregoing in that it may be desirable to keep the temperature of the liquid in the pipe below a certain set temperature. Therefore, insulation is used to try and keep, the liquid cool. There may be deleterious effect on the liquid if it becomes heated while flowing through the pipe.

This invention is designed to be used in the field. There may be a break in the insulation of the pipe in the field and it is necessary to repair this break. This invention is designed so that an artisan can go into the field and apply this insulation to the pipe. In certain instances the pipe may have been installed without insulation and it is necessary to add insulation.

2. Description of the Prior Art

There is a type of insulation which is commercially available. This type of insulation comprises a half shell of polyurethane foam. The foam is a solid foam and the half shell can be placed on the pipe so that the pipe is completely surrounded by the two half shells of polyurethane foam. Then, there may be wrapped around the exterior of the polyurethane foam, a positioning and a protective material. For example, there may be wrapped around the exterior of the polyurethane foam on the pipe a thin sheet of metal, about 0.064 inches in thickness. This thin sheet of metal is a half wrap so that there are actually two layers of the metal surrounding the polyurethane foam on the pipe. In place of the thin sheet of metal, there may be used a mastic tape. Again, there is a half overlap wrap or two thicknesses of the mastic tape.

This type of unit and repair of broken insulation or the addition of new insulation to a pipe is labor-intensive and time-consuming. As a result, cost of applying these two half shells of polyurethane to a pipe is not economical.

Many years ago, a patent was awarded to a Donald J. Smith, U.S. Pat. No. 3,337,681, as of 1967 Aug. 22. This patent taught of a protective shield for joining two electrical cables. The electrical shield provided a protection for the junction of the two electrical cables and to prevent moisture contacting said junction.

(e) SUMMARY

The invention comprises a preformed section of insulation which can be placed around the exterior of the pipe. The preformed section of insulation comprises a waterproof membrane which is positioned adjacent to the pipe. On the outside of the waterproof membrane there is an insulator. On the outside of the insulator there is a protective outer layer of a tough, flexible and resilient material whose purpose is to resist penetration and breakage of the tough outer layer.

The section of insulation comprises three concentric layers of waterproof membrane, insulation and the tough outer layer of flexible, resilient material.

Further, there is electrical fusion means for positioning the section permanently onto the pipe.

The sections may be 8 feet in length and may be 12 feet in length.

OBJECTS AND ADVANTAGES

An object of this invention is to provide an insulation kit which can be applied to pipe in the field;

A further object is to provide an insulation kit which is light in weight and easily carried to the place of use;

An additional object is to provide an insulation kit which is easily applied for first time insulation or for repair of a break in the insulation;

An additional object is to provide an insulation kit which has the ease of assembling and a short time of assembly so that the insulation kit can be applied in a short period of time to the pipe;

Another object is to provide an insulation kit which has lengths of insulation in the range of 8 feet to 13 feet for ease of application of the insulation to the pipe; and, Additional objects, advantages and novel features of the invention will be set forth in part in the description which follows, and in part will become apparent to those skilled in the art upon examination of the following or may be learned by the practice of the invention. The objects and advantages of the invention may be realized and attained by means of the instrumentalities and combinations particularly pointed out in the appended claims.

(f) BRIEF DESCRIPTION OF THE DRAWINGS

In the drawings, it is seen that:

Figure 3:
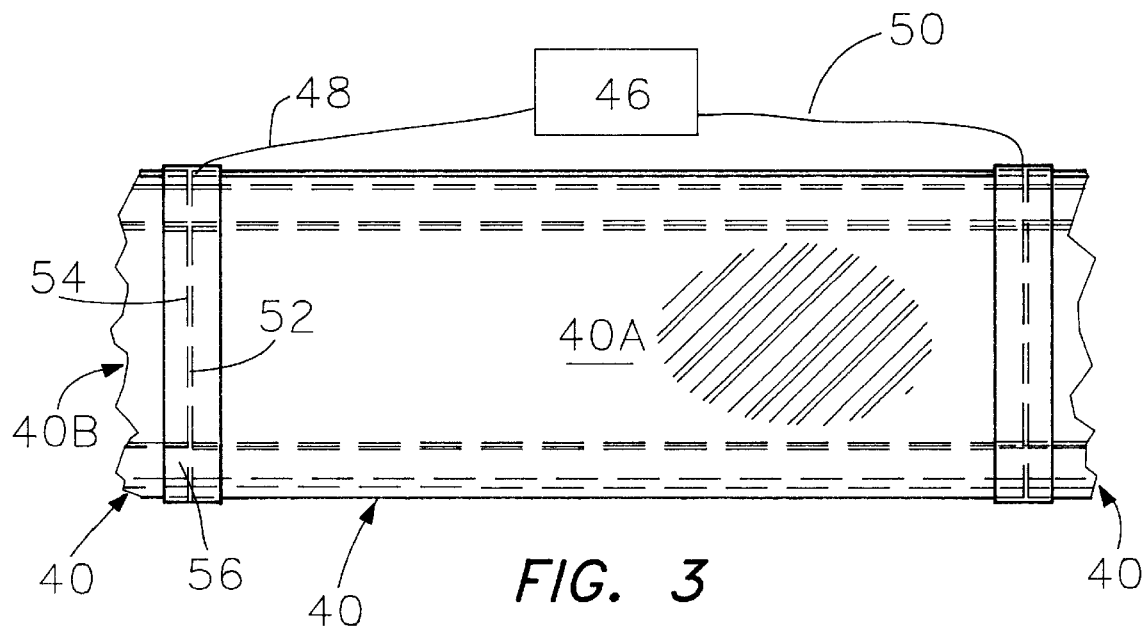
Figure 4:
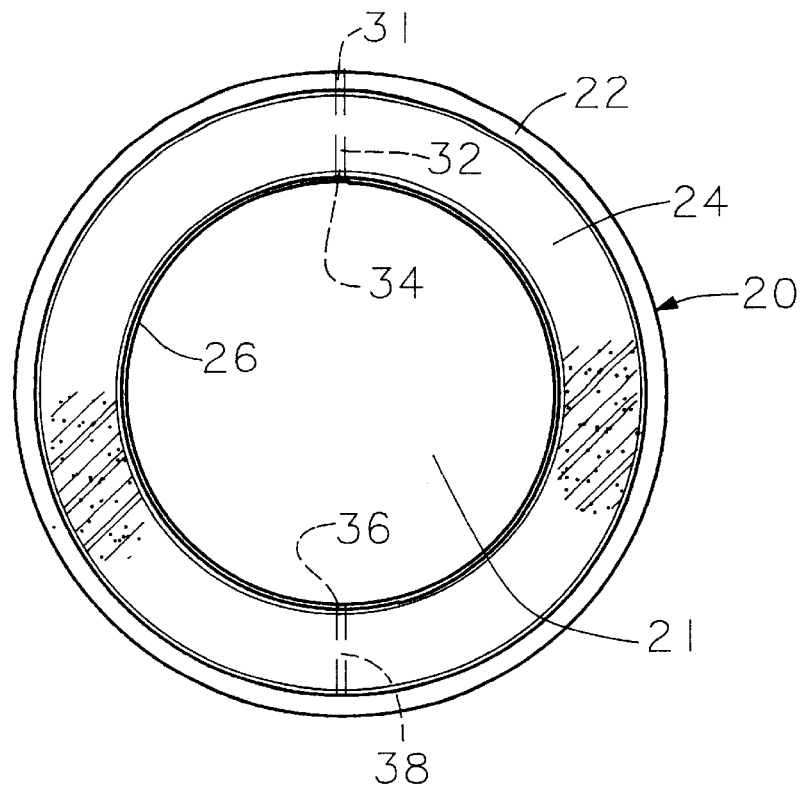

FIG. 3 is a side-elevational view illustrating the insulation kit around a section of the pipe and also the tape encircling adjacent pieces of the insulation kit and shows a longitudinal wire between split edges the flexible, resilient outer layer; and, FIG. 4 is an end elevational view of the insulation kit prior to splitting some of the components into substantially two sections for ease of movement and separation so that the kit is flexible and can be easily applied to a pipe.

(g) DESCRIPTION OF THE PREFERRED EMBODIMENT(S)

With reference to FIG. 4 it is seen that there is provided insulation in a tubular form 20.

The tubular form 20 has a central passageway 21 for accommodating the pipe to be insulated.

The outer circular member 20 is a high-density polyethylene 22. 22 is essentially a protective layer for the insulation. 22 can be hit with a hammer, kicked with a shoe or a boot, hit with a screw driver or other similar objects and still retain the shape and not break. Further, 22 is flexible.

Inside of the circular member 22, there is a circular member which, is the insulation. The insulation is polyurethane 24.

Inside of the polyurethane insulation 24, there is a moisture barrier 26. The moisture barrier 26 can contact the pipe which is being insulated.

Figure 1:
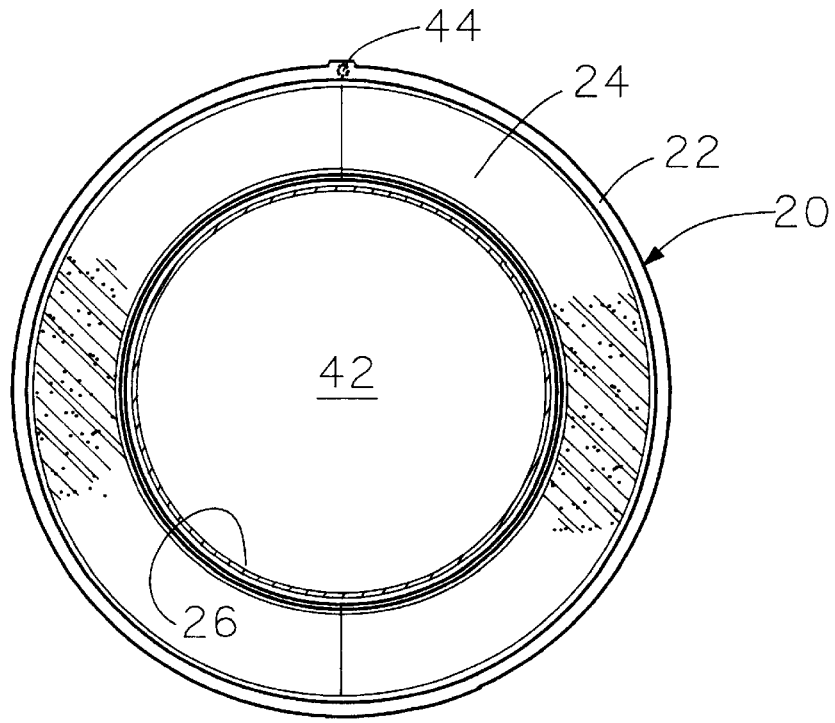
FIG. 1 is an end elevational view of the insulation kit as applied to the exterior of a pipe.

The insulation 20, as depicted in FIG. 4 cannot be applied readily to a pipe. It is necessary to split the circular members of insulation so that 20 can be formed into an insulation kit 40 as depicted in FIG. 1. To form the insulation kit 40, it is necessary to split the circular members. For example, with the upper part of the insulation 20 in FIG. 4, as the reference, the high-density polyethylene 22 can be divided, see the phantom line 31. This is a potential split.

Then, the polyurethane 24 can be split at 32, see the phantom line 32.

Then, the moisture barrier 26 can be split or divided as illustrated at 34, see the dotted line.

At approximately 180 degrees from the split 34, the moisture barrier can be split at 36, see the phantom line. Then, the polyurethane can be split at 38, see the phantom line 38.

It is called to the attention of the reader that the high-density polyethylene 22 is split only once at the top of FIG. 4 and at 31. The high-density polyethylene is not split at the bottom of FIG. 4.

Figure 2:
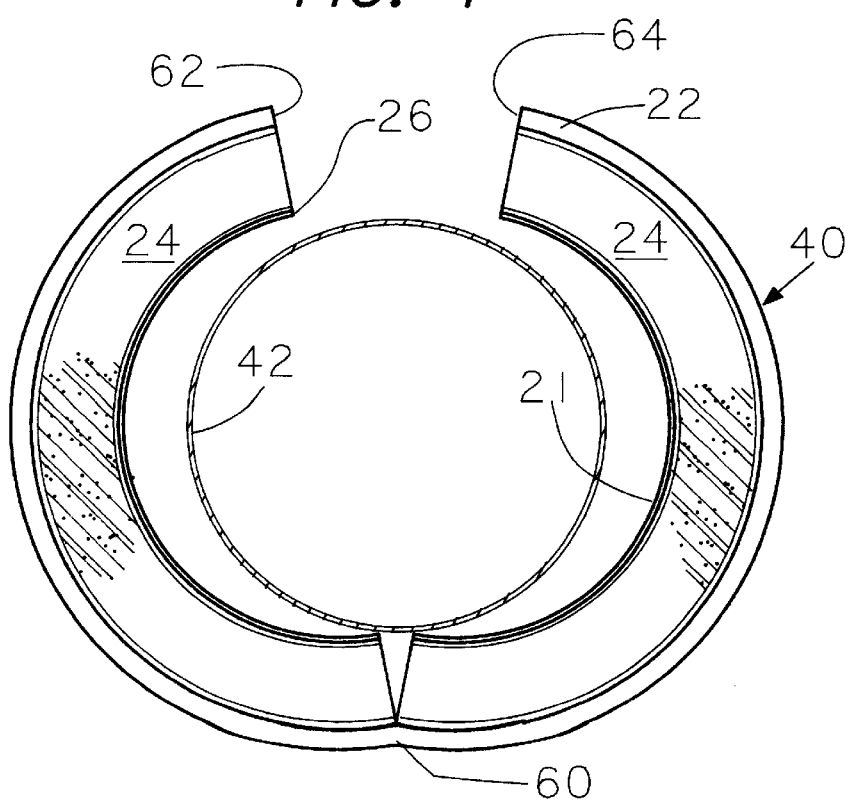
FIG. 2 is an end elevational view of the pipe and the insulation kit as split at two places, about 180 degrees apart to substantially form two sections, with the flexible outer layer split at one place, to allow the sections to rotate.

The result is a flexible insulation kit 40, see FIG. 2, which can be spread apart around the solid high-density polyethylene at the bottom 60 of FIG. 4. In other words, the high-density polyethylene at the bottom of FIG. 4 functions as a hinge around which the two halves of the insulation can be rotated and moved.

In FIGS. 2 and 4 it is seen that the divides 31, 32, 34, 36 and 38 are spread apart so that the insulation kit 40 can be positioned around a pipe 42.

In FIG. 1 it is seen that the insulation kit 40 is tightly wrapped around the pipe 42. It is necessary to unite the two split ends, 62 and 64, of the high-density polyethylene 30. The split ends 62 and 64 are united the length of outer layer 22. This uniting of these split high-density polyethylene edges 62 and 64 is accomplished by means of an electric wire 44. The electric wire 44 is laid longitudinally along the two sections of the high-density polyethylene 22. Then, the electric wire is connected to a power box 46 by means of wires 48 and 50. The power box 46 is 120 volts or 240 volts and about 6 to 12 amps. By heating the high-density polyethylene for about six minutes with the voltage at 120 volts and 6 to 12 amps the high-density polyethylene melts and it is possible to fuse longitudinally together the two sections of high-density polyethylene to have a water-tight and vapor-tight barrier on the outside of the polyethylene layer 22. This is illustrated in FIG. 1.

Sometimes a hot air blower can be used to assist in positioning the wire 44. Hot air can be blown onto the edges 62 and 64 to soften the polyethylene 22 so as to readily receive the wire 44. The edges 62 and 64 pushed together and electricity passed through the wire 44 to melt and to fuse together the two edges 62 and 64.

The insulation kit 40 is approximately 8 feet long or 12 feet long. It is light in weight and can be readily applied to the exterior of the pipe 42.

The pipe 42 can have various exterior diameters such as 14 inches, 16 inches, 20 inches to name a few. This means that the interior diameter of the moisture barrier 26 will vary to accommodate the exterior diameter of the pipe. This further means that the dimensions of the polyurethane 24 and the dimensions of the high-density polyethylene 22 will vary to accommodate the size of the pipe 42 and the exterior diameter of the pipe 42. This further means that there will have to be various size insulation kits 40 to accommodate the various size pipes 42.

A specific example of the insulation kit 40 is that outer circular member 20 has an external diameter of 19.75 inches and that the internal diameter of the moisture barrier 26 is 14.75 inches. The thickness or the polyurethane is about 2⅛ inches. The thickness of polyethylene 22 is about 3/16 inches.

In FIG. 3, a side-elevational view of the insulation kit 40 on the pipe, it is seen that there are abutting insulation kits 40.

In FIG. 3 it is seen that there is an insulation kit 40A on the pipe 42. This insulation kit has an abutting end 52.

Also, there is an insulation kit 40B having an abutting end 54. The abutting end 54 of the insulation kit 40B is adjacent to the abutting end 52 of the insulation kit 40A. There can be wrapped around the two abutting ends 52 and 54, a tape 56 for sealing the insulation kits from moisture and air and also the ambient temperature.

One method of manufacture of the insulation kit 40 is to extrude the high-density polyethylene member 22 which is essentially a tube.

The moisture barrier 26 may be wrapped around a form which can be another tube.

The high-density polyethylene member 22 is positioned around the vapor barrier member 26 and spaced the desired distance. Then, the reactants for polyurethane 24 can be inserted into the space between the moisture barrier 26 and the extruded tube 22 and allowed to react. Upon solidification, the insulation kit 40 can be removed from the circular member or tube inside of the moisture barrier 26. Again, the length of the insulation kit 40 can be 8 feet or 12 feet. There is no definite limit to the length of the insulation kit 40. From experience in the field, we have placed the length of the insulation kit 40 at 8 feet and 12 feet. From experience we have found that it is desirable to coat the inside surface of the extruded tube 22 with an adhesive such as hg-924. The application thickness of the adhesive will be such that a physical lock is achieved between the polyurethane foam and the extruded high-density polyethylene tube 22. In order to achieve this lock it is necessary that all foreign material be removed from the interior high-density polyethylene tube 22 prior to the coating operation. This adhesive operation seems to insure that the polyurethane foam 22 and the extruded high-density polyethylene tube 22 are bonded to each other.

Some of the physical characteristics of the high-density polyethylene 22 are that it be made from a polyethylene resin compound qualified as Type III, Category 5, Class C, Grade P23 or P24 as per ASTM D1248. The color of the polyethylene 22 is black with a carbon black content of 2%; base density, 58.7 pounds per foot; minimum tensile yield, 3200 psi; minimum elongation, 400%; minimum hardness, Shore D, 45; minimum Izod impact, 1.5 ft-pounds per inches; minimum brittleness temperature, 248 degrees F. The casing should be manufactured in a continuous extrusion method so that the preinsulated composite jacket has no seams for the entire length of the composite.

A source of the high-density polyethylene is KWH Pipe Canada Ltd., address of 6539 A Mississauga Road, Mississauga, Ontario, Canada L5N 1A6.

Specifications for the polyurethane foam 24 are a core density, minimum 2.8 pounds per cubic foot and maximum 4.0 pounds per cubic foot; minimum compressive strength parallel to axis of pipe, 35 psi; minimum of closed cell content, 90%; maximum water absorption, 0.05 pounds per square foot; maximum water vapor, 5.0 pounds per square foot; dimensional stability at −20 degrees F., 1%; dimensional stability at +100 degrees F., 3%; maximum K-factor, 0.165 btu-in/hr ft degrees F. A source of the polyurethane foam components can be Stephan Company, North Field, Ill. 60093. Another source can be Polymer development Laboratories, Inc., Orange, Calif. 92665.

The moisture barrier 26 is sold by Dupont under the registered trademark, Tyvek Housewrap, P.O. Box 80705, Wilmington, Del. 19880-0705. This material is often used to cover chip core in a house under construction. It acts as a moisture barrier so that moisture cannot seep into the wood chips in the chip core. Tyvek is used in construction products and is made from 100% flash spunbonded high-density polyethylene fibers which have been bonded together by heat and pressure, without binders or filters into a tough, durable sheet structure. Additives have been incorporated into the polyethylene to provide ultraviolet light resistance.

In a lateral cross-sectional view the insulation kit 40 shows three concentric circles. The reader is to realize that the cross-sectional view may be polygonal with three sides, four sides, five sides for example. The circle is generally accepted but in place of the circle there may be used a polygonal configuration.

In the foregoing it is seen that we have introduced a totally new and unique field applied totally waterproof insulation system for operating conditions of −100 degrees F. to +240 degrees F. There is employed a polyurethane foam. The polyurethane foam has a minimum of 90% closed cell of density ranges of 2.8 to 4.0 pounds per cubic foot with a low commercially "K" factor available. Also, there is provided a heavy-duty, flexible and resilient extruded high-density polyethylene foam 22. The foam 22 can be hit with a hammer, can be kicked, and can withstand general bad treatment because of its structure. The high-density polyethylene extruded tube 22 is a protective material for the polyurethane foam 24.

Further, under sufficiently high temperature conditions, the high-density polyethylene will melt and fuse to itself. This is important from the standpoint of fusing, with a hot electric wire, the two pieces; of high-density polyethylene. The result is a totally watertight system. One of the reasons this insulation system can be used is that the polyethylene is sufficiently flexible so that it can be bent around itself without breaking or cracking. This is brought forth in the drawings where the one part of the tube 22 has been longitudinally severed; the polyurethane foam 24 has been severed; and, the moisture barrier has been severed. Nevertheless, these two severed sections can be rotated away from each other so as to receive and to accommodate a pipe to be insulated. After receiving the pipe the two half sections can be rotated toward each other and then under the influence of the hot electric wire, the polyethylene melts and fuses to form one continuous joint or connection.

I claim:

1. An insulation for pipe in tubular integral form and comprising:
   a) a flexible and resilient water-tight and vapor-tight outer tube having what was formerly two longitudinal edges which were fused into a unitary continuous said outer tube;
   b) an insulating tube inside of said outer tube;
   c) said insulating tube comprising two half tubes for encircling said pipe;
   d) a moisture barrier tube inside of said insulating tube to define a recess for receiving said pipe;
   e) said moisture barrier tube comprising two half tubes for encircling said pipe; and
   f) said outer tube being sufficiently flexible that prior to said two longitudinal edges being fused, said two longitudinal edges can be rotated with respect to each other with said outer tube still being unitary.

2. An insulation for pipe according to claim 1 and comprising:
   a) an electrical conductor positioned adjacent to said two longitudinal edges and fused into said resilient outer tube to form said unitary outer tube.

3. An insulation for pipe according to claim 1 and comprising:
   a) said flexible outer tube being high density polyethylene;
   b) said insulating tube being polyurethane foam; and
   c) said moisture barrier tube being flash spunbonded high-density polyethylene fibers which have been bonded together by heat and pressure to form a sheet structure.

4. An insulation for pipe according to claim 1 and comprising:
   a) a bonding agent bonding together said outer tube and said insulating tube.

5. An insulation for pipe according to claim 1 and comprising:
   a) said flexible outer tube being high-density polyethylene qualified as type III, category 5, class C, selected from Grades P23 and P24 as per ASTM D1248;
   b) said insulating tube being polyurethane foam having a core density in the range of about 2.8 pounds to about 4.0 pounds per cubic foot and a minimum closed cell content of about 90%; and
   c) said moisture barrier tube being flash spunbonded high-density polyethylene fibers which have been bonded together by heat and pressure to form a sheet structure.

6. An insulation for pipe according to claim 1 and comprising:
   a) an electrical conductor positioned adjacent to said two longitudinal edges and fused into said resilient outer tube to form said unitary outer tube;
   b) said flexible outer tube being high density polyethylene;
   c) said insulating tube being polyurethane foam;
   d) said moisture barrier tube being flash spunbonded high-density polyethylene fibers which have been bonded together by heat and pressure to form a sheet structure; and
   e) a bonding agent bonding together said outer tube and said insulating tube.

7. An insulation for pipe according to claim 1 and comprising;
   a) an electrical conductor positioned adjacent to said two longitudinal edges and fused into said resilient outer tube to form said unitary outer tube;
   b) said flexible outer tube being high-density polyethylene qualified as type III, category 5 class C, selected from Grades P23 and P24 as per ASTM D1248;
   c) said insulating tube being polyurethane foam having a core density in the range of about 2.8 pounds to about 4.0 pounds per cubic foot and a minimum closed cell content of about 90%;
   d) said moisture barrier tube being flash spunbonded high-density polyethylene fibers which have been bonded together by heat and pressure to form a sheet structure; and
   e) a bonding agent bonding together said outer tube and said insulating tube.

8. An insulation for pipe according to claim 1 and comprising:
   a) an electrical conductor positioned adjacent to said two longitudinal edges and fused into said resilient outer tube to form said unitary outer tube; and
   b) a bonding agent bonding together said outer tube and said insulating tube.

9. A combination of insulation for pipe and said pipe, and comprising:
   a) said insulation for said pipe being in tubular form and comprising a flexible and resilient water-tight and vapor-tight outer tube having what was formerly two longitudinal edges which were fused into a unitary continuous said outer tube;
   b) an insulating tube inside of said outer tube;
   c) said insulating tube comprising two half tubes for encircling said pipe;
   d) a moisture barrier tube inside of said insulating tube to define a recess for receiving said pipe;
   e) said moisture barrier tube comprising two half tubes for encircling said pipe;
   f) said outer tube being sufficiently flexible that prior to said two longitudinal edges being fused, said two longitudinal edges can be rotated with respect to each other with said outer tube still being unitary; and
   g) said pipe being inside of said moisture barrier tube.

10. A combination according to claim 9 and comprising:
    a) an electrical conductor positioned adjacent to said two longitudinal edges and fused into said resilient outer tube to form said unitary outer tube.

11. A combination according to claim 9 and comprising:
    a) said flexible outer tube being high density polyethylene;
    b) said insulating tube being polyurethane foam; and
    c) said moisture barrier tube being flash spunbonded high-density polyethylene fibers which have been bonded together by heat and pressure to form a sheet structure.

12. A combination according to claim 9 and comprising:
    a) a bonding agent bonding together said outer tube and said insulating tube.

13. A combination according to claim 9 and comprising:
    a) said flexible outer tube being high-density polyethylene qualified as type III, category 5, class C, selected from Grades P23 and P24 as per ASTM D1248;
    b) said insulating tube being polyurethane foam having a core density in the range of about 2.8 pounds to about 4.0 pounds per cubic foot and a minimum closed cell content of about 90%; and
    c) said moisture barrier tube being flash spunbonded high-density polyethylene fibers which have been bonded together by heat and pressure to form a sheet structure.

14. A combination according to claim 9 and comprising:
    a) an electrical conductor positioned adjacent to said two longitudinal edges and fused into said resilient outer tube to form said unitary outer tube;
    b) said flexible outer tube being high density polyethylene;
    c) said insulating tube being polyurethane foam;
    d) said moisture barrier tube being flash spunbonded high-density polyethylene fibers which have been bonded together by heat and pressure to form a sheet structure; and
    e) a bonding agent bonding together said outer tube and said insulating tube.

15. A combination according to claim 9 and comprising:
    a) an electrical conductor positioned adjacent to said two longitudinal edges and fused into said resilient outer tube to form said unitary outer tube;
    b) said flexible outer tube being high-density polyethylene qualified as type III, category 5, class C, selected from Grades P23 and P24 as per ASTM D1248;
    c) said insulating tube being polyurethane foam having a core density in the range of about 2.8 pounds to about 4.0 pounds per cubic foot and a minimum closed cell content of about 90%;
    d) said moisture barrier tube being flash spunbonded high-density polyethylene fibers which have been bonded together by heat and pressure to form a sheet structure; and
    e) a bonding agent bonding together said outer tube and said insulating tube.

16. A combination according to claim 9 and comprising:
    a) an electrical conductor positioned adjacent to said two longitudinal edges and fused into said resilient outer tube to form said unitary outer tube; and
    b) a bonding agent bonding together said outer tube and said insulating tube.

* * * * *